(12) United States Patent
Lee et al.

(10) Patent No.: US 11,466,618 B2
(45) Date of Patent: Oct. 11, 2022

(54) DIRECT-FIRED SUPERCRITICAL CARBON DIOXIDE POWER GENERATION SYSTEM AND METHOD

(71) Applicant: KOREA INSTITUTE OF ENERGY RESEARCH, Daejeon (KR)

(72) Inventors: Dae-Keun Lee, Daejeon (KR);
Dong-Soon Noh, Daejeon (KR);
Chang-Bog Ko, Daejeon (KR);
Young-Tae Guahk, Suwon-si (KR);
Seung-Gon Kim, Daejeon (KR);
Min-Jung Lee, Daejeon (KR);
Eun-Kyung Lee, Sejong-si (KR);
Woo-Nam Jung, Daejeon (KR);
Nam-Su Kim, Busan (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 17/288,213

(22) PCT Filed: Sep. 30, 2019

(86) PCT No.: PCT/KR2019/012717
§ 371 (c)(1),
(2) Date: Apr. 23, 2021

(87) PCT Pub. No.: WO2020/085668
PCT Pub. Date: Apr. 30, 2020

(65) Prior Publication Data
US 2021/0404381 A1    Dec. 30, 2021

(30) Foreign Application Priority Data
Oct. 25, 2018 (KR) .................. 10-2018-0128309

(51) Int. Cl.
| | | |
|---|---|---|
| F02C 3/34 | (2006.01) | |
| F02C 7/141 | (2006.01) | |
| F02C 7/22 | (2006.01) | |
| F02C 6/00 | (2006.01) | |
| F02C 6/18 | (2006.01) | |

(52) U.S. Cl.
CPC .............. F02C 3/34 (2013.01); F02C 7/141 (2013.01); F02C 7/22 (2013.01); F02C 6/00 (2013.01); F02C 6/18 (2013.01)

(58) Field of Classification Search
CPC ...... F02C 3/22; F02C 6/00; F02C 3/34; F02C 6/18; F02M 26/22; F02M 26/35; F02M 35/10301
See application file for complete search history.

(56) References Cited

U.S. PATENT DOCUMENTS

| | | |
|---|---|---|
| 4,498,289 A | 2/1985 | Osgerby |
| 6,149,714 A | 11/2000 | Kobayashi |

(Continued)

FOREIGN PATENT DOCUMENTS

| | | |
|---|---|---|
| JP | 2000-304206 A | 11/2000 |
| JP | 2001-509878 A | 7/2001 |
| KR | 10-1497623 B1 | 3/2015 |

OTHER PUBLICATIONS

Allam et al., "Demonstration of the Allam Cycle: An update on the development status of a high efficiency supercritical carbon dioxide power process employing full carbon capture", Energy Procedia, vol. 114, 2017, pp. 5948-5966.

*Primary Examiner* — William H Rodriguez
(74) *Attorney, Agent, or Firm* — Birch, Stewart, Kolasch & Birch, LLP

(57) ABSTRACT

The present invention provides a direct-fired supercritical carbon dioxide power generation system and a power generation method thereof, the system comprising: a combustor for burning hydrocarbon fuel and oxygen; a turbine driven by combustion gas discharged from the combustor; a heat (Continued)

exchanger for cooling combustion gas discharged after driving the turbine, by heat exchange with combustion gas recycled and supplied to the combustor; and an air separation unit for separating air to produce oxygen, wherein a portion of the combustion gas discharged after driving the turbine is branched before being introduced to the heat exchanger and is supplied to the air separation unit.

12 Claims, 1 Drawing Sheet

(56) References Cited

U.S. PATENT DOCUMENTS

| | | | |
|---|---|---|---|
| 6,298,664 B1 | 10/2001 | Asen et al. | |
| 8,596,075 B2 | 12/2013 | Allam et al. | |
| 8,959,887 B2 | 2/2015 | Aliam et al. | |
| 10,018,115 B2* | 7/2018 | Allam | F25J 3/04018 |
| 2008/0302107 A1* | 12/2008 | Fan | F23L 7/007 |
| | | | 60/783 |
| 2010/0064855 A1* | 3/2010 | Lanyi | C21B 7/002 |
| | | | 75/458 |
| 2012/0056431 A1* | 3/2012 | Bland | C10L 5/366 |
| | | | 290/52 |
| 2013/0036723 A1* | 2/2013 | La Force | F02C 7/10 |
| | | | 60/39.461 |
| 2013/0133337 A1* | 5/2013 | ELKady | F23J 15/06 |
| | | | 60/805 |
| 2017/0183782 A1* | 6/2017 | Kirby | F01D 5/288 |
| 2017/0234280 A1* | 8/2017 | Habib | F02M 26/35 |
| | | | 60/605.2 |
| 2018/0038277 A1 | 2/2018 | Habib et al. | |
| 2018/0058318 A1* | 3/2018 | Allam | F02C 1/06 |
| 2020/0276535 A1* | 9/2020 | Callahan | F02C 6/18 |

* cited by examiner

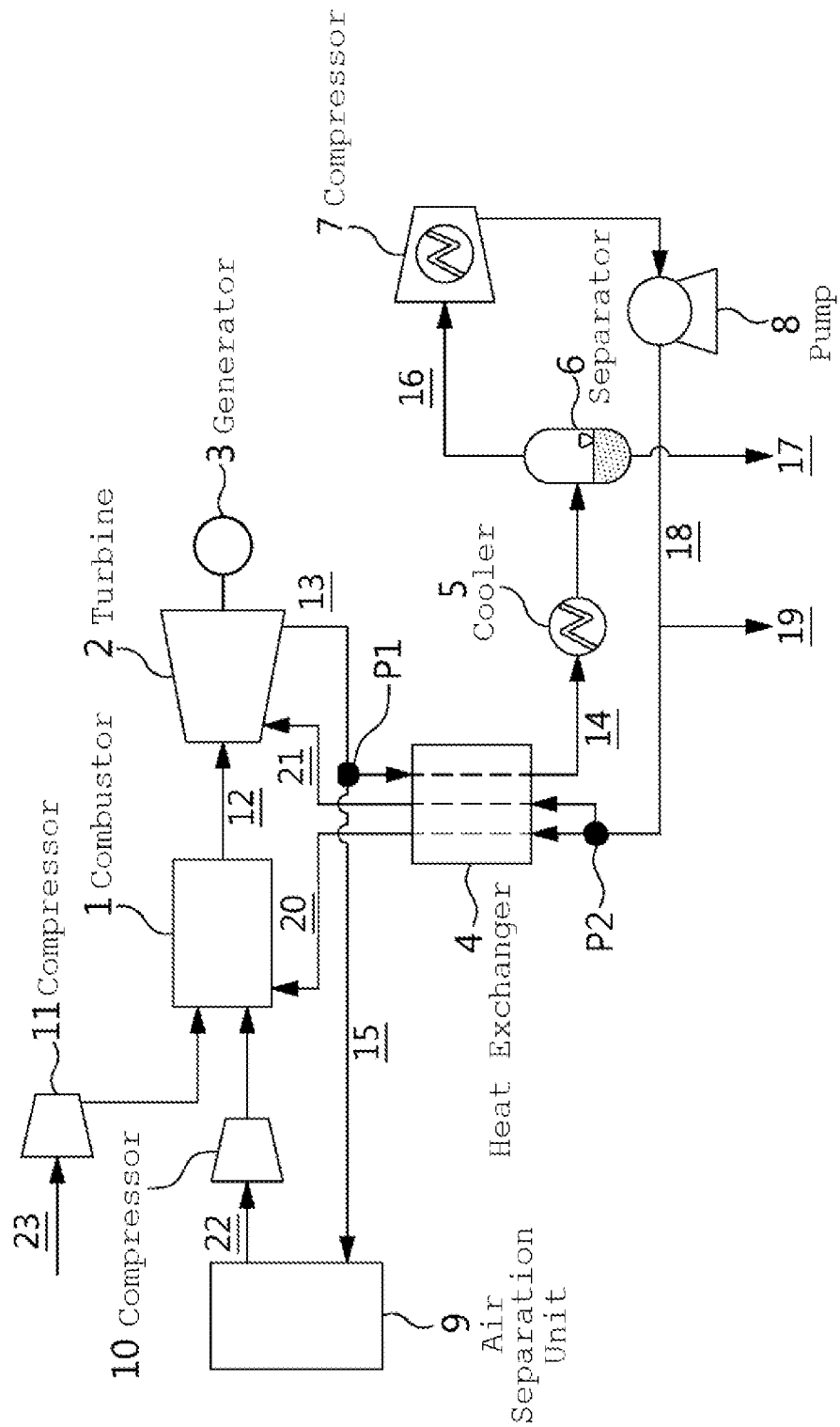

DIRECT-FIRED SUPERCRITICAL CARBON DIOXIDE POWER GENERATION SYSTEM AND METHOD

CROSS REFERENCE TO RELATED APPLICATIONS

This application is the National Phase of PCT International Application No. PCT/KR2019/012717, filed on Sep. 30, 2019, which claims priority under 35 U.S.C. 119(a) to Korean Patent Application No. 10-2018-0128309, filed in the Republic of Korea on Oct. 25, 2018, all of these applications are hereby expressly incorporated by reference into the present application.

TECHNICAL FIELD

The present invention relates to a system and a method for direct-fired supercritical carbon dioxide power generation which pertains to a direct-fired supercritical carbon dioxide power generation technology.

BACKGROUND ART

A supercritical carbon dioxide power generation technology is a Brayton cycle type of electric power generation technology in which a turbine is driven by carbon dioxide at or above a critical point (31° C. and 7.4 MPa) as a working fluid. Recently, studies for demonstration of the supercritical carbon dioxide power generation technology have been carried out on the basis of advantages that use of a working fluid in a supercritical state which has characteristics of both a liquid and a gas not only enables power to be highly efficiently generated but also enables a size of a power generation system to be reduced and that use of carbon dioxide as a working fluid enables 100% recycle of carbon dioxide.

The supercritical carbon dioxide power generation technology is divided into indirect and direct types depending on a heating method of supercritical carbon dioxide which is a working fluid. The indirect supercritical carbon dioxide power generation technology is a method of driving a turbine by indirectly heating carbon dioxide in a supercritical state with an external heat source by using a heat exchanger and works in a closed loop cycle, and recent studies focus on a method for using nuclear power, concentrated solar heat, industrial waste heat, or the like as an external heat source.

On the other hand, the direct-fired supercritical carbon dioxide power generation technology is a method of driving a cycle by directly heating supercritical carbon dioxide which is a product of combustion generated from combustion of hydrocarbon fuel and pure oxygen and which is the working fluid, and this technology works in a semi-closed loop cycle in which carbon dioxide and a small amount of water generated as products of combustion are discharged.

The power generation efficiency is higher in the direct-fired method than in the indirect method. In addition, since additional equipment for separating carbon dioxide does not need to be provided, and generation of nitrogen oxide is basically excluded, the direct-fired method has more advantages in terms of economy and environment than the conventional combined cycle power generation has.

A representative example of a direct-fired supercritical carbon dioxide power generation cycle is the Allam cycle, and power generation efficiency of the Allam cycle is reported to be 59% when the natural gas is used, and the power generation efficiency thereof is reported to be 51% when the coal is used (see 'Non Patent Literature 1' below).

Incidentally, the Allam cycle uses a method of additionally supplying heat from an air separation unit (ASU) as a unit that supplies oxygen, in addition to exhaust of a turbine, in order to supplement a lack of heat in a process of recuperation of a working fluid, and thus a high-capacity air separation unit such as a cryogenic oxygen manufacturing device needs to be provided. In addition, the Allam cycle has a disadvantage in that a structure of a heat exchange for recuperation becomes complicated.

CITATION LIST

Patent Literature (Patent Literature 1)
U.S. Pat. No. 8,596,075 B2 (Dec. 3, 2013)
(Patent Literature 2)
U.S. Pat. No. 8,959,887 B2 (Feb. 24, 2015)

Non Patent Literature (Non Patent Literature 1)
Demonstration of the Allam Cycle: An update on the development status of a high efficiency supercritical carbon dioxide power process employing full carbon capture by Allam et al., Energy Procedia, 2017, No. 114, pp. 5948-5966.

SUMMARY OF INVENTION

Technical Problem

The present invention is made to solve such problems described above, and an object thereof is to provide a direct-fired supercritical carbon dioxide power generation system and a power generation method thereof in which an additional heat source for recuperation is not supplied from an external unit such as an air separation unit.

Solution to Problem

According to the present invention for solving such problems described above, there is provided a direct-fired supercritical carbon dioxide power generation system including: a combustor for burning hydrocarbon fuel and oxygen; a turbine driven by combustion gas discharged from the combustor; a heat exchanger for cooling combustion gas discharged after driving the turbine, by heat exchange with combustion gas recycled and supplied to the combustor; and an air separation unit for separating air to produce oxygen. A portion of the combustion gas discharged after driving the turbine is branched before being introduced to the heat exchanger and is supplied to the air separation unit.

Here, the combustion gas discharged after driving the turbine may have a temperature of 750° C. or higher.

In addition, the combustion gas discharged from the combustor may have a temperature of 1,150° C. or higher.

The air separation unit may be an ion transport membrane unit.

Combustion gas supplied to the air separation unit may be used as sweeping gas at an ion transport membrane.

Combustion gas used as the sweeping gas may be mixed with oxygen generated at the ion transport membrane and may be supplied to the combustor.

The turbine may be formed of a ceramic matrix composite.

In addition, according to the present invention, there is provided a direct-fired supercritical carbon dioxide power generation method including: a step of burning hydrocarbon fuel and oxygen in a combustor; a step of driving a turbine by combustion gas discharged from the combustor; a step of cooling combustion gas discharged after driving the turbine in a heat exchanger, by heat exchange with combustion gas recycled and supplied to the combustor; and a step of separating air to produce oxygen in an air separation unit. A portion of the combustion gas discharged after driving the turbine is branched before being introduced to the heat exchanger and is supplied to the air separation unit.

Advantageous Effects of Invention

In a direct-fired supercritical carbon dioxide power generation system and a power generation method, heat does not need to be supplied from an external unit such as an air separation unit in a recuperation process, and a structure of a heat exchanger for recuperation can be simplified.

BRIEF DESCRIPTION OF DRAWINGS

FIG. 1 is a system diagram of a direct-fired supercritical carbon dioxide power generation system according to the present invention.

DESCRIPTION OF MAIN REFERENCE SIGNS IN DRAWINGS

1: Combustor
2: Turbine
3: Generator
4: Heat Exchanger
5: Cooler
6: Separator
7: Compressor
8: Pump
9: Air Separation Unit
10, 11: Compressor
12, 13, 14, 15, 16, 17, 18, 19, 20, 21, 22, 23: Fluid Flow
P1, P2: Branching Point

PREFERRED EMBODIMENTS FOR CARRYING OUT THE INVENTION

Hereinafter, an embodiment of the invention will be described with reference to the drawings. Incidentally, the detailed description of a known function or configuration which can unnecessarily obscure the gist of the present invention will be omitted.

FIG. 1 is a system diagram of a direct-fired supercritical carbon dioxide power generation system according to the present invention.

As illustrated in FIG. 1, the power generation system includes a combustor 1 for burning fuel and an oxidizer and a turbine 2 driven by combustion gas discharged (flow 12) from the combustor 1, and the turbine 2 is connected to a generator 3.

Here, the combustion gas (300 bar and 1,150° C. or higher) discharged from the combustor 1 contains not only a product of combustion generated by the fuel and oxidizer but also carbon dioxide which is supplied (flows 20 and 22) to the combustor 1 and is discharged along with the product of combustion from the combustor 1.

In the present invention, the fuel supplied (flow 23) to the combustor 1 is hydrocarbon fuel such as natural gas (LNG) or methane, and the oxidizer is pure oxygen supplied (flow 22) from an air separation unit 9. The fuel and oxidizer are pressurized to reach 300 bar by a compressor (10 or 11) and is supplied to the combustor 1.

A temperature of the combustion gas discharged from the combustor 1 is set to 1,150° C. or higher for implementation of an independent recuperation process from an external heat source and for supplying of extra heat to the air separation unit 9 which will be described below according to a characteristic of the present invention.

While combustion gas (30 bar and 750° C. or higher), which drives the turbine 2 and is discharged (flow 13), is sequentially cooled through a heat exchanger 4 and a cooler 5, vapor in the combustion gas is condensed (flow 14), and condensed vapor is discharged (flow 17) as water through a separator 6 and is removed from the combustion gas. The fuel and oxygen are burned at a theoretical air-fuel ratio in the combustor 1, and thus combustion gas (flow 16), from which the vapor is removed while flowing through the separator 6, approximately consists of carbon dioxide.

The combustion gas (carbon dioxide) flowing out of the separator 6 is pressurized (flow 18) to 300 bar while passing through a compressor 7 and a pump 8 and is recuperated and heated through the heat exchanger 4 to be supplied (flow 20) to the combustor 1 for cooling of a combustor liner or diluting a product of combustion at a downstream area of a combustion region. At this point, a portion of the combustion gas is discharged (flow 19) to capture carbon dioxide, and an amount of discharged carbon dioxide corresponds to an amount of carbon dioxide generated by burning of the fuel and oxidizer in the combustor 1. Preferably, the compressor 7 is applied to intermediate cooling.

On the other hand, in the present invention, a portion of the combustion gas discharged (flow 13) after driving the turbine 2 is branched (branching point P1) before being introduced to the heat exchanger 4 and is supplied (flow 15) to the air separation unit 9. At this point, the amount of combustion gas supplied to the air separation unit 9 can be controlled by a flow rate controller (not illustrated) provided at the branching point P1.

In the present invention, the air separation unit 9 is an ion transport membrane unit, high-temperature (750° C. or higher) combustion gas supplied to the air separation unit 9 is used as sweeping gas at an ion transport membrane, and the combustion gas used as the sweeping gas is mixed with oxygen generated at the ion transport membrane and is supplied (flow 22) to the combustor 1.

In other words, according to the present invention, a temperature of the combustion gas discharged from the combustor 1 is set to 1,150° C. or higher, and thereby the combustion gas (flow 20) supplied to the combustor 1 from the heat exchanger 4 is sufficiently recuperated without additional heating from an external heat source, and supply of extra heat to the air separation unit 9 enables efficiency of the entire system including the air separation unit 9 to increase.

In the present invention, a heat resistance problem of the turbine 2 which arises by setting the temperature of the combustion gas discharged from the combustor 1 to 1,150° C. or higher can be solved by using a ceramic matrix composite (CMC).

In FIG. 1, Reference sign 21 represents a flow of recycled combustion gas for cooling of the turbine 2, and Reference sign P2 represents a branching point for the flow. In the present invention, the flow of recycled combustion gas for cooling of the turbine 2 is optional, and when the optional flow is applied, it is preferable that the recycled combustion gas at 400° C. or lower be discharged from the heat exchanger 4.

Meanwhile, a direct-fired supercritical carbon dioxide power generation method according to the present invention includes, based on a configuration of the direct-fired supercritical carbon dioxide power generation system described above, a step of burning hydrocarbon fuel and oxygen in the combustor 1, a step of driving the turbine 2 by combustion gas discharged from the combustor 1, a step of cooling combustion gas discharged after driving the turbine 2 in the heat exchanger 4, by heat exchange with the combustion gas recycled and supplied to the combustor 1, and a step of separating air to produce oxygen the an air separation unit 9. In particular, the method further includes a step of branching a portion of the combustion gas discharged after driving the turbine 2, before being introduced to the heat exchanger 4, and supplying the portion to the air separation unit 9.

According to the direct-fired supercritical carbon dioxide power generation system and the power generation method of the present invention, heat does not need to be supplied from an external unit such as the air separation unit in a recuperation process, and a structure of the heat exchanger for recuperation can be simplified.

As described above, the embodiments of the present invention are described in detail with reference to the accompanying drawings; however, the embodiments disclosed in this specification and the accompanying drawings are used only to simply describe the technical ideas of the present invention and are not used to limit the scope of the present invention described in Claims. Hence, it is construed for a person with ordinary skill in the art to be able to variously modify the present invention and derive other equivalent embodiments from the present invention.

The invention claimed is:

1. A direct-fired supercritical carbon dioxide power generation system comprising:
   a combustor for burning hydrocarbon fuel and oxygen;
   a turbine driven by combustion gas discharged from the combustor;
   a heat exchanger for cooling combustion gas discharged after driving the turbine, by heat exchange with combustion gas recycled and supplied to the combustor; and
   an air separation unit for separating air to produce the oxygen,
   wherein a portion of the combustion gas discharged after driving the turbine is branched before being introduced to the heat exchanger and is supplied directly to the air separation unit without additional heating,
   wherein the combustion gas discharged after driving the turbine has a temperature of 750° C.,
   wherein the combustion gas discharged from the combustor has a temperature of 1,150° C., and
   wherein the combustion gas discharged from the combustor has a pressure of about 300 bar.

2. The direct-fired supercritical carbon dioxide power generation system according to claim 1,
   wherein the air separation unit is an ion transport membrane unit.

3. The direct-fired supercritical carbon dioxide power generation system according to claim 2,
   wherein combustion gas supplied to the air separation unit is used as sweeping gas at an ion transport membrane.

4. The direct-fired supercritical carbon dioxide power generation system according to claim 3,
   wherein combustion gas used as the sweeping gas is mixed with the oxygen generated at the ion transport membrane and is supplied to the combustor.

5. The direct-fired supercritical carbon dioxide power generation system according to claim 1,
   wherein the turbine is formed of a ceramic matrix composite (CMC).

6. The direct-fired supercritical carbon dioxide power generation system according to claim 1,
   wherein the combustion gas discharged after driving the turbine has a pressure of about 30 bar.

7. A direct-fired supercritical carbon dioxide power generation method comprising:
   burning hydrocarbon fuel and oxygen in a combustor;
   driving a turbine by combustion gas discharged from the combustor;
   cooling combustion gas discharged after driving the turbine in a heat exchanger, by heat exchange with combustion gas recycled and supplied to the combustor; and
   separating air to produce the oxygen in an air separation unit,
   wherein a portion of the combustion gas discharged after driving the turbine is branched before being introduced to the heat exchanger and is supplied directly to the air separation without additional heating,
   wherein the combustion gas discharged after driving the turbine has a temperature of 750° C.,
   wherein the combustion gas discharged from the combustor has a temperature of 1,150° C., and
   wherein the combustion gas discharged from the combustor has a pressure of about 300 bar.

8. The direct-fired supercritical carbon dioxide power generation method according to claim 7,
   wherein the air separation unit is an ion transport membrane unit.

9. The direct-fired supercritical carbon dioxide power generation method according to claim 8,
   wherein combustion gas supplied to the air separation unit is used as sweeping gas at an ion transport membrane.

10. The direct-fired supercritical carbon dioxide power generation method according to claim 9,
    wherein combustion gas used as the sweeping gas is mixed with the oxygen generated at the ion transport membrane and is supplied to the combustor.

11. The direct-fired supercritical carbon dioxide power generation method according to claim 7,
    wherein the combustion gas discharged after driving the turbine has a pressure of about 30 bar.

12. The direct-fired supercritical carbon dioxide power generation method according to claim 7,
    wherein the turbine is formed of a ceramic matrix composite (CMC).

* * * * *